US008639732B2

(12) United States Patent
Fujita et al.

(10) Patent No.: US 8,639,732 B2
(45) Date of Patent: Jan. 28, 2014

(54) METHOD FOR STORING AND READING-OUT DATA HANDLED BY APPLICATION OPERATING ON HTTP CLIENT, DATA STORAGE PROGRAM, AND DATA READ-OUT PROGRAM

(75) Inventors: Takeshi Fujita, Chiba ken (JP);
Tsutomu Kawachi, Tokyo (JP); Keiichi Ogawa, Tokyo (JP)

(73) Assignee: Sony Corporation, Tokyo (JP)

( * ) Notice: Subject to any disclaimer, the term of this patent is extended or adjusted under 35 U.S.C. 154(b) by 149 days.

(21) Appl. No.: 12/440,741

(22) PCT Filed: Sep. 11, 2007

(86) PCT No.: PCT/JP2007/067682
§ 371 (c)(1),
(2), (4) Date: Oct. 15, 2009

(87) PCT Pub. No.: WO2008/032717
PCT Pub. Date: Mar. 20, 2008

(65) Prior Publication Data
US 2010/0115005 A1 May 6, 2010

(30) Foreign Application Priority Data

Sep. 12, 2006 (JP) ................................ 2006-246716

(51) Int. Cl.
*G06F 17/30* (2006.01)
(52) U.S. Cl.
USPC ....................................................... 707/822
(58) Field of Classification Search
USPC ....................................................... 707/822
See application file for complete search history.

(56) References Cited

U.S. PATENT DOCUMENTS

| 6,209,036 | B1 * | 3/2001 | Aldred et al. | 709/229 |
|---|---|---|---|---|
| 2002/0054090 | A1 * | 5/2002 | Silva et al. | 345/747 |
| 2002/0069218 | A1 * | 6/2002 | Sull et al. | 707/501.1 |
| 2002/0080927 | A1 * | 6/2002 | Uppaluru | 379/88.01 |
| 2005/0240909 | A1 * | 10/2005 | Tersigni | 717/140 |
| 2007/0100833 | A1 * | 5/2007 | Chen et al. | 707/10 |

FOREIGN PATENT DOCUMENTS

| JP | HEI 10-097483 | 4/1998 |
| JP | 2003-167740 | 1/2005 |

OTHER PUBLICATIONS

Japanese Office Action issued on Feb. 8, 2011, for corresponding Japanese Patent Appl. No. 2008-534353.
Yuichiro Masui, Usability revolution by Ajax JavaScript Well-known advanced technology that Google uses many times, WEB+DBPRESS vol. 27 first edition, Japan, Gijutsu Hyoron Corporation Co., Ltd., Jun. 28, 2006, vol. 27, pp. 112-140.

* cited by examiner

*Primary Examiner* — Hosain Alam
*Assistant Examiner* — Johnese Johnson
(74) *Attorney, Agent, or Firm* — K&L Gates LLP

(57) ABSTRACT

The aim of the present invention is to eliminate these inconveniences present in the prior that the examples, especially, to offer the technique of storing the data handled by the WEB application operating on the HTTP client, to a local file system. Here, this invention allows user to handle the data not only from the WEB applications but also from the stand-alone applications operating on the HTTP client. To resolve this problem, based on this invention, processes are performed on the data handled by the application operating on the HTTP client.

8 Claims, 11 Drawing Sheets

```
<html>
<head>
<title>Bookmarklet sample</title>
<script type="text/javascript">
<!--
/*
    Sample program for saving long string:
Divide 26 characters string into each 6 characters strings to save them in 5 booklets.
    div id = 'tgt' for read, div id = 'get1' for output, div
id = 'get2' for output
*/
var ary = new Array();
function fload(id, total, cnt, st1, st2) {
    if (!ary[id]) {
        ary[id] = new Array();
    }
    if (ary[id][cnt]) {
        return;
    }
    ary[id][cnt] = new Object();
    ary[id][cnt].st1=st1;
    ary[id][cnt].st2=st2;
    if (total == ary[id].length) {
        for (var i = 0; i < ary[id].length; i++) {
            if (ary[id][i] == undefined || ary[id][i]
== null) {
                alert(i + ' ' + ary[id][i]);
                return;
            }
        }
        var stFin1 = '';
        var stFin2 = '';
        for (var i = 0; i < total; i++) {
            stFin1 += ary[id][i].st1;
            stFin2 += ary[id][i].st2;
        }
        document.getElementById('get1').innerText = stFin1;
        document.getElementById('get2').innerText = stFin2;
    }
}
function doonclick() {
    var tgtvalue = document.getElementById('tgt').innerText;
    var dvlink = document.getElementById('link');
```

Fig10

```
        dvlink.innerHTML='';
        var len = Math.ceil(tgtvalue.length/6);
        var c = 0;
        var Dt = new Date();
        var id = 'id_' + Dt.getTime();
        while (tgtvalue.length > c * 6) {
            var linkobj = document.createElement('a');
            linkobj.id='bm' + id + c;
            linkobj.innerText='bm_' + id + '_' + c;

var st1=tgtvalue.substr(c*6,3);
            var st2=tgtvalue.substr(c*6+3,3);

linkobj.href='javascript:void(fload("'+id+'","'+len+','+c
+',"'+st1+'","'+st2+'"))';

dvlink.appendChild(linkobj);
            var br = document.createElement('br');
            dvlink.appendChild(br);
            c++;

}
        var dv = document.createElement('dv');
        dv.innerText = 'All above links +c+', Save them;
        dvlink.appendChild(dv);
}
-->
</script>
</head>
<body>
<H1>Bookmarklet sample</H1>

<div id = 'tgt'
onclick='doonclick()'>abc123def456ghi789jkl012mn
</div><br>
<div id = 'get1'>Output area 1</div>
<div id = 'get2'>Output area 2</div>
<br>
<div id = 'link'></div>
</body>
</html>
```

Fig11

METHOD FOR STORING AND READING-OUT DATA HANDLED BY APPLICATION OPERATING ON HTTP CLIENT, DATA STORAGE PROGRAM, AND DATA READ-OUT PROGRAM

CROSS-REFERENCE TO RELATED APPLICATIONS

This application is the National Stage of International Application No. PCT/JP2007/067682 filed Sep. 11, 2007, which claims the benefit of Japanese Patent Application No. 2006-246716 filed Sep. 12, 2006, the disclosures of which are incorporated herein by reference in their entireties.

TECHNICAL FIELD

This invention relates to the method for data storing and reading-out handled by the application operating on HTTP client, data storage program, and data read-out program. Especially, it relates with processes like saving the data of the application operating on an HTTP client to a local file system and reading-out data from a local file system.

BACKGROUND

There are several WEB (World Wide Web) applications operating on an HTTP (Hypertext Transfer Protocol) client. Generally, WEB application saves the data handled by corresponding WEB application on the server or read-out it from the corresponding server for processing.

However, depending on the status of communication on internet or status of operation of the server, some times the data created on the WEB application cannot be saved properly, thereby resulting in inconvenience.

The applicant does not know the existence of a well-known technical document of this prior technique.

Recently, not only WEB applications run on HTTP client but in many cases, the application operating on the OS as a stand alone application also run operate HTTP client. In such cases, user might want some common interface for data storage and data read-out regardless whether application operating on the HTTP client is a WEB application or stand-alone application.

SUMMARY

The aim of the present invention is to eliminate these inconveniences present in the prior that the examples, especially, to offer the technique of storing the data handled by the WEB application operating on the HTTP client, to a local file system.

Here, this invention allows user to handle the data not only from the WEB applications but also from the stand-alone applications operating on the HTTP client.

To resolve this problem, based on this invention, the following processes are performed on the data handled by the application operating on the HTTP client.

The No. 1 invention includes the steps that processing means embeds the said data in a position information region of the hyperlink and saves the corresponding hyperlink in a local file system.

The No. 2 invention includes the steps that processing means reads out the data handled by the application operating on the said HTTP client from the position information area of the hyperlink saved in a local file system.

The No. 3 invention includes a step that processing means stores the data substance in a local file system, and a step that processing means obtains the identifier of the corresponding stored data, and a step that processing means embeds the identifier of the corresponding acquired data in a position information region of the hyperlink and a step that processing means stores corresponding hyperlink in a local file system.

The No. 4 invention includes a step that processing means reads out the identifier of the data handled by the application operating on the said HTTP client from the position information region of the hyperlink stored in a local file system and a step that processing means reads out the data itself linked with the identifier of the corresponding data from a local file system.

The No. 5 invention includes a step that processing means embeds the position information of an application operating on the said HTTP client and the data handled by the corresponding application in a "address information storage region" present in a book mark file and a step that processing means stores the corresponding book mark file in a local file system.

The No. 6 invention includes a step that processing means stores the said data in a local file system and a step that processing means acquires the identifier of the corresponding stored data and a step that processing means embeds the position information of the application operating on the said HTTP client and embeds an identifier of the said acquired data and a step that processing means stores corresponding book mark file in a local file system.

The No. 7 invention includes a step that processing means receives the No. 1 storage action and a step that processing means receives the No. 1 storage action, then generates the window object other than the window object of the browser operating the said application and finally describes the data handled by the said application in a source of each corresponding window object.

Furthermore, a step that processing means accepts the No. 2 storage action and a step that processing means stores the source (including the data handled by the application) described in each said window object in a local file system as a data file after the No. 2 storage action is received.

The No. 8 invention includes a step that processing means accepts the file path identifier of the data substance file including the said data and a step that processing means passes the file path identifier of the received corresponding data substance file to the said application. Furthermore, it includes a step that processing means issues an XMLHttpRequest against a place of the local directory, which is indicated by the corresponding file path identifier in an application acquiring the corresponding file path identifier. Depending on the issue of XMLHttpRequest, a step that processing means acquires the data substance file situated at a place indexed by the said file path identifier in a said application and a step that processing means acquires a value of the application data described in the corresponding data substance file.

The No. 9 invention includes a step that processing means stores the said data in a memory storage region by dividing in plurality of the data fragments and a step that processing means embeds the said plurality of the data fragments after distributing it in the plurality of the position information region of the hyperlinks and a step that processing means stores the said plurality of the hyperlinks in a local file system.

The No. 10 invention includes a step that processing means reads out the plurality of the data fragments from the plurality of the position information region of the hyperlinks stored in a local file system and a step that processing means reconfigures the data handled by application operating on the said HTTP client after the said plurality of the data fragments are combined. With this, we tried to resolve the said problem.

BRIEF DESCRIPTION OF THE DRAWINGS

FIG. 10 is an example of HTML file of web application in which No. 10 Embodiment is used (preceding step).

FIG. 11 is an example of HTML file of web application in which No. 10 Embodiment is used (successor step).

DETAILED DESCRIPTION OF ILLUSTRATIVE EMBODIMENTS

According to this invention, the mechanism storing the application data of the WEB application operating on the HTTP client is saved in a local file system can be achieved comparatively easily by using an existing bookmark function.

Figure 1:
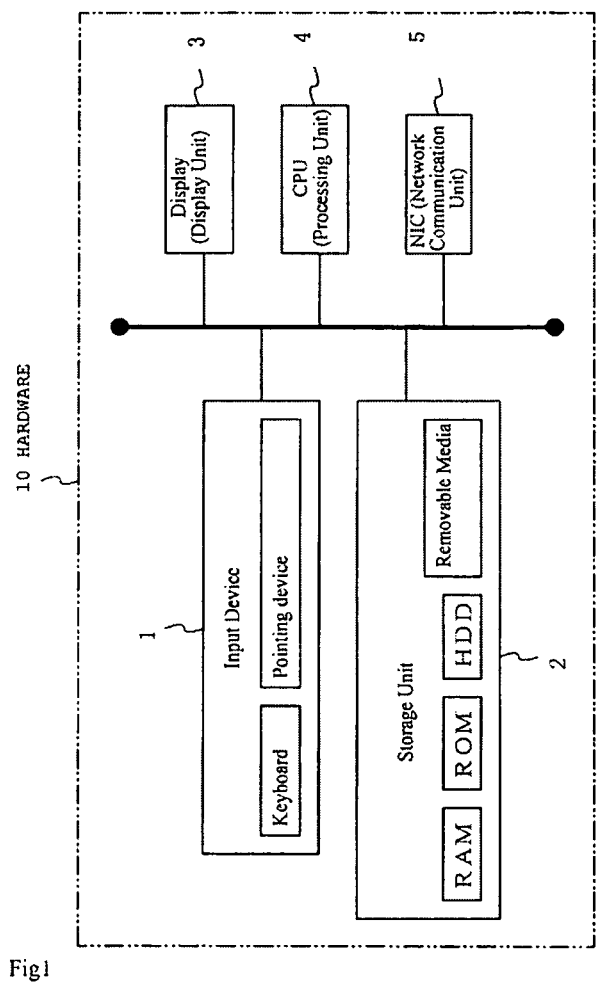
FIG. 1 is a configuration diagram of the computer used to execute this invention.

FIGS. 1-11 use the following notation:
Memory Means 2
Processing Means 4
HTTP Client 12
Application 13
Bookmark Processing Means 21
File storage means 22
File read-out means 23
Best format to execute the invention Below is the explanation about embodiment of this invention. FIG. 1 is a configuration diagram of computer, which executes this invention. The computer used for execution of this applied invention is equipped with elements of general-purpose computer. It is equipped with input means 1 such as keyboard, pointing device, the memory means 2 such as RAM (Random Access Memory), ROM (Read Only Memory), HDD (Hard Disk Drive), removable media, the display means 3 such as display monitor, the processing means 4 such as CPU (Central Processing unit), the communication means such as NIC (Network Interface Card).

Diagram 2 is a configuration diagram of software, which executes above-mentioned processing means 4. HTTP client 12 is executed on OS (Operating System) 11, further more, application 13 such as WEB application is executed on HTTP client 12, while executing this invention. Moreover, an input or output process is executed on hardware 10 indicated in Diagram 1 using hardware driver 14.

[No. 1 Embodiment]

Figure 3:
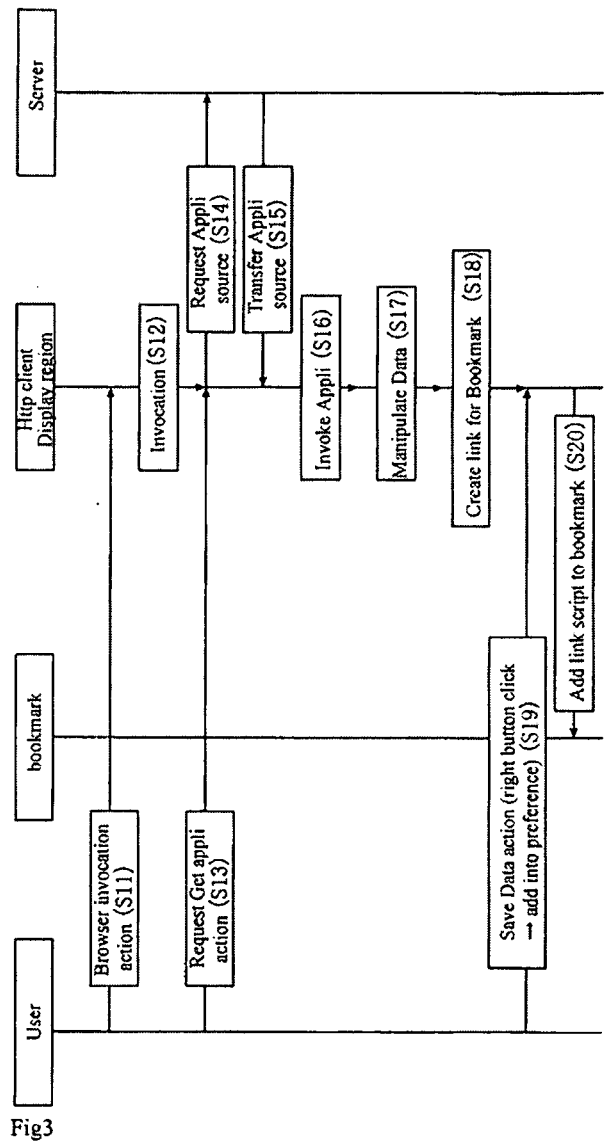
FIG. 3 is an operation explanation diagram of the No. 1 Embodiment.

No. 1 Embodiment includes a process that processing means 4 stores corresponding book mark file in a local file system managed by OS11 after storing the data handled by application 13 in "address information storage region" in argument format of executable script. Details of this operation are described based on FIG. 3. In FIG. 3, the [user] shows the user who operates Hardware 10 or the User interface offered to the corresponding user. Same is applicable for other diagrams described later.

Processing means 4 receives Browser start action from Input step 1 depending on the user. The processing means 4, which received this action, starts HTTP client 12 (Browser, HTTP client display region) on OS11.

Next, Processing means 4, depending on the user, receives an "application acquisition request action" from input means 1. The processing means 4, which received this action, send a request for source (program) of application 13 through HTTP client 12 (S14). External server, responding to this request, provides source of prescribed application 13 to HTTP client 12 (S15). When the source of application 13 is acquired by HTTP client 12, the processing means 4 starts application 13 on HTTP client 12 (S16).

This embodiment includes a step that application 13 executes JavaScript (Registered trademark). Furthermore, operation of application 13 is achieved by executing the source of application 13 by processing means 4. Same is applicable for the processes later to No. 2 Embodiment.

Application 13 provides an environment where user can process application data. Application 13 performs the prescribed data processing according to the said action after the data processing action is received from user through input step 1. For instance, application data is maintained in an innerHTML property of display object and data processing is achieved by re-writing the said property.

Next, application 13 stores the processed data in position information region (URI region) of either existing or newly created hyperlink, and displays the said hyperlink in display region of HTTP client.

For instance, let us consider that the contents of HTML object tgt1 and tgt2 available on application are acquired in following format.

var tgt1doc=document.getElementByld("tgt1").innerHTML;

var tgt2doc=document.getElementByld("tgt2").innerHTML;

Now, for instance, the following script can be written, when you want to store these contents in the variable in executable script format saved in a bookmark file.

var st='javaScript:void(fload("'+tgt1doc+'","'+tgt2doc+'"))';

To store this value in href property of hyperlink, let us continue description as given below (S18).

document.links[0].href=st;

Here, document.links is an array that includes all of the hyperlink objects, displayed on HTML, as element. To specify the link to change the href property value, the values that match with the elements, which specify the said link, can be specified as index of this array.

Next, processing means 4 receives the book mark request action in the hyperlink in which above mentioned data is embedded. User requests for this action from input means 1. For instance, if an Internet Explorer (Registered trademark) 6.0 which is a standard web browser used in Window (Registered trademark) environment, then right clicking the mouse 1 on hyperlink, which is displayed in display means 3, and operation of selecting the [Add to My Favorites] becomes Book mark request action.

The processing means 4, which received this book mark request action, stores the book mark file related to the above mentioned hyperlink in memory step 2 depending on the well known book mark storage process (S20). With this, the application data processed in application 13 is stored in local file system as variable of executable script.

[No. 2 Embodiment]

Next, the operation deployed on application 13 by reading-out the application data being saved in local book mark file is explained. Details are described based on FIG. 4 as follows.

Figure 4:
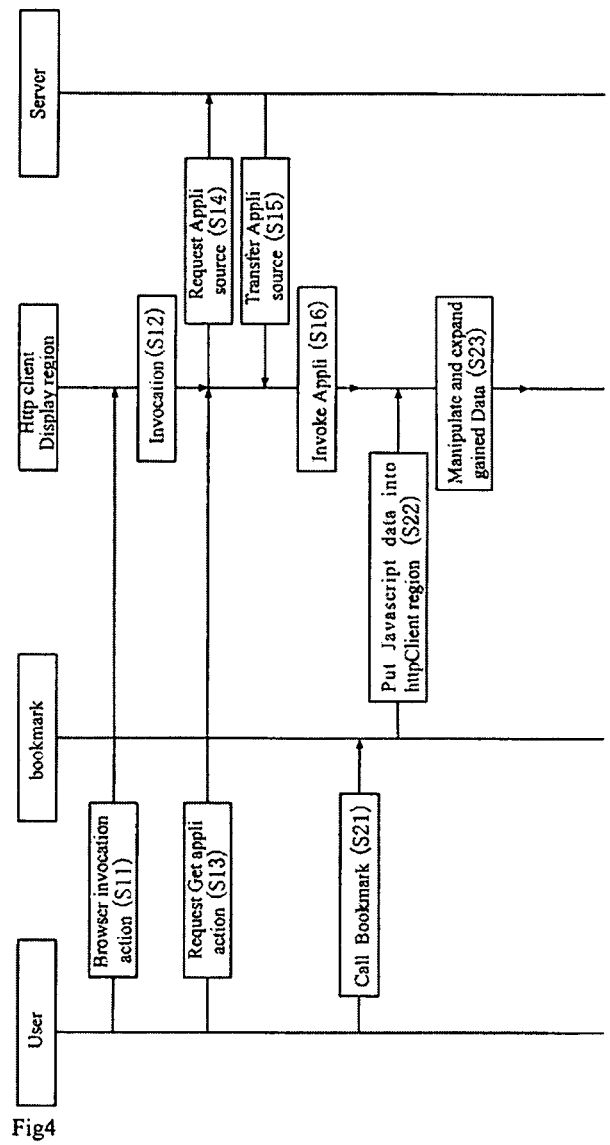
FIG. 4 is an operation explanation diagram of the No. 2 Embodiment.

In FIG. 4, the operation from step S11 to S16 is an operation with which the application 13 on HTTP client 12 is started. Duplicate explanation is omitted, since this process is same for the S11 to Step S16 of No. 1 Embodiment.

After starting the application 13, the processing means 4 receives book mark calling action from user (S21). Book mark calling action means, for instance, the operation of selecting the book mark from [My Favorites] menu of HTTP client, or the operation of directly opening the book mark file after selecting it from browser menu bar.

When this action is received from input means 1, the processing means 4 reads-out the data from "address information storage region" of bookmark file and passes it to application 13.

Details of the method used to achieve this operation are given below. Initially, while storing the application data in "address information storage region" of bookmark file, not only the data is stored, but also the script is stored as given below.

javascript:void(fload("Value of Area 1", "Value of Area 2"))    (1)

Application 13 is an executable function and fload( ) shows the deployment function and the data read-out which is already defined in script of application 13. This fload( ) function, for instance, is a substitute function of innerHTML property of display object which specifies the data taken as an argument.

The following script can be considered as a practical example of deployment function and data read-out set as default.

```
function fload(doc1, doc2){
    var tgt1=document.getElementById("tgt1");
    var tgt2=document.getElementById("tgt2");
    tgt1.innerHTML = doc1;
    tgt2.innerHTML = doc2;
}
```

If the calling action of the corresponding bookmark is requested, when the script of the said description (1) is stored in "address information storage region" of the bookmark file, the processing means 4 reads out the above-mentioned script from an "address information storage region" of the corresponding bookmark file and execute it in HTTP client 12. If HTTP client 12 executes the corresponding script, the said bookmarklet is executed and the script is executed against application 13 operating on HTTP client 12 (S22). As a result, Application 13 calls and executes the fload( ) function described in script. The application data is substituted with innerHTML property of given display object which is controlled by application 13 and the data saved in book mark file is displayed in display object of application 13 (S23).

Here, in above mentioned operation, the data is stored in book mark file or the data which is read-out from the book mark file, may be divided in to, not only one, but in plurality of the book mark files or the data which is divided in to plurality of the book mark files can be read-out and used. More details are provided in No. 10 Embodiment. In this embodiment, the application that saves application data and the application that reads the application data need not to be the same application. The data can be read-out from the application, if the said application can use function equivalent to above-mentioned fload( ).

In above mentioned embodiment, either the value is written in area of HTML or may be directly mentioned in script saved in book mark or you may allow to define above mentioned data reading out function in an "address information storage region" of the book mark file. In such case, for instance, the script saved in bookmark shall be written as follows, in which even an object with a value written on it is specified.

javascript:void(document.getElementById("tgt1")
.innerHTML="d1");void(document.getElementById("tgt2").innerHTML="d2")

[No. 3 Embodiment]

Next, an example of transformation storing the data hyperlink is explained. In this embodiment, the data is stored in an argument part of the hyperlink specifying an application-acquiring source. Details are described based on FIG. 5 as follows.

Figure 5:
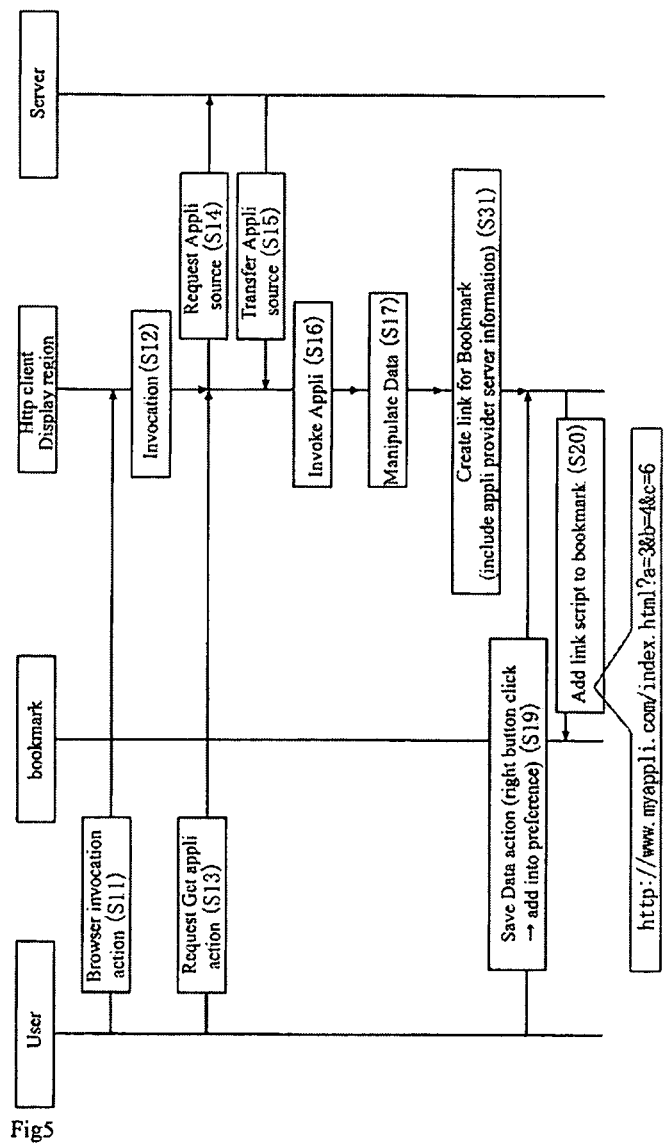
FIG. 5 is an operation explanation diagram of the No. 3 Embodiment.

In FIG. 5, the operation from step S11 to S17 starts the browser 12, further starts the application 13 on the said browser 12 and performs the application data processing. Duplicate explanation, since it is same as the operation of the No. 1 Embodiment, is omitted. Further, the steps S19 and S20 in FIG. 5 include the operation that saves the bookmark file of generated hyperlink in the local. In this case, also, the duplicate explanation, since it is same as the steps S19 and S20 of No. 1 Embodiment, is omitted.

The feature of this embodiment includes that to specify an application acquiring information as a hyperlink position information and further to store the application data as an argument to application acquiring information. Here, this argument need not necessarily be a content, which can be interpreted by the logic prepared on the server side beforehand.

Here, the application acquiring position information is taken as http://www.myappli.com/index.html and the application data that is stored in hyperlink is considered as a=3, b=4, c=6.

Processing means 4 creates the hyperlink for bookmark in step S31. Hyperlink creation method, for instance, is same as the step S18 of No. 1 Embodiment that re-writes the href property of hyperlink object. In this case, as a hyperlink position information, the information is created by adding an application data to the application acquiring position information.

For instance, it is created like http://www.myappli.com/index.html?a=3&b=4&c=6. As a result, in step S20, the bookmark file, which has "http://www.myappli.com/index.html?a=3&b=4&c=6" in "address information storage region", is stored in the local. That is, the application data along with the application acquiring address is stored in the local.

Here, the address specified for an application acquiring address may be not matched to the application which creates a hyperlink though the data was stored as an argument of an application acquiring address.

[No. 4 Embodiment]

Next, an explanation about operation of acquiring the application data from the bookmark file that was stored in the local in the No. 3 Embodiment and deploying it on the application, is given. Details are described based on FIG. 6 as follows.

Initially, the duplicate explanation is omitted, since the step S11 and S12 are the "Browser starting steps" and are same as No. 1 Embodiment. The user had caused the "application acquisition request action" in the No. 2 Embodiment even though the application was suppose to be started after this process. In this embodiment, the bookmark file stored in local with No. 3 Embodiment as an "application acquisition request action" is opened. It is because an application acquiring position information is described in a bookmark file.

The processing means 4 receives the bookmark calling action against the book mark file saved in No. 3 Embodiment and passes the position information stored in the corresponding book mark file to HTTP client as UTI (Uniform Resource Identifier) used for GET request. As a result, same as No. 1 Embodiment, the HTTP client 12 starts the Application 12 by acquiring the source of Application 12 from server (S14~S16).

This embodiment includes a process that an application being started acquires the application data from the parameter present after the "?" of URI, which performed said GET request (S43).That acquisition, for instance, is performed as described below. The parameter (Character String) present after the "?" of URI can acquire the information related to the URI of displayed application as character string from the location object. For instance, on the other hand, it is possible to acquire it by applying the "character string operation function" of the split method specifying the delimiter. In addition, the value of the application data can be taken out from the character string by applying the character string operation function of the split method of specifying delimiter "&" and "=" to the acquired parameter character string.

Processing means 4 displays the application data acquired from parameter of URI in display object on application 13. That method is same as the step S23 of No. 2 Embodiment.

[No. 5 Embodiment]

Figure 7:
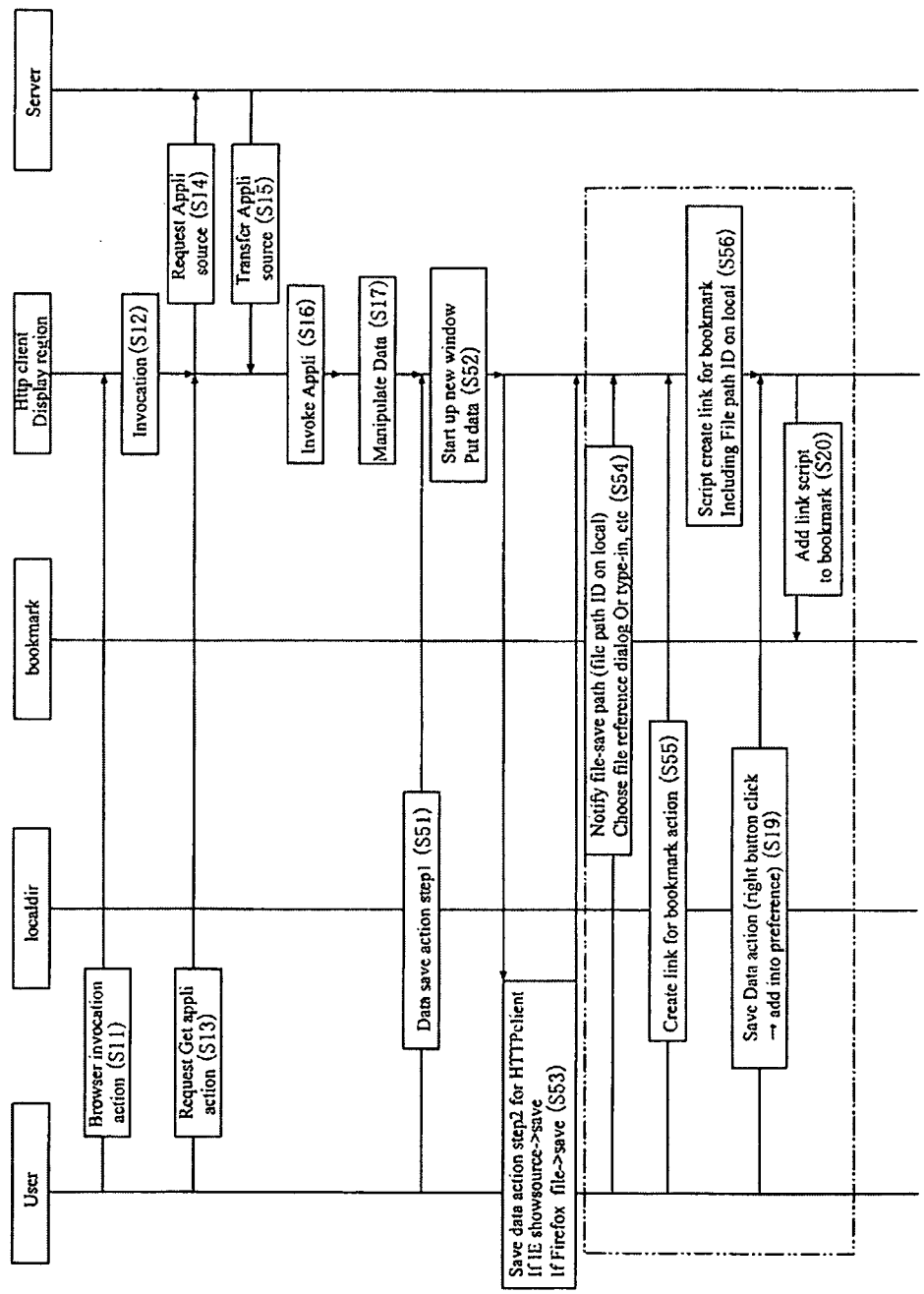
FIG. 7 is an operation explanation diagram of the No. 5 Embodiment.

In continuation to the explanation in the embodiment, the substance of the application data is not stored in the bookmark file but the location (identifier) of the application data substance is stored in the bookmark file. FIG. 7 describes the details. In FIG. 7, the "localdir" shows the local directory in the local file system managed by the OS11. The same is applicable for the drawings, which are described next sections.

First, the repeat explanation is omitted, because the steps until S11-S17 which starts browser 12 and application 13 are same as No. 1 Embodiment.

User storing the data on application 13, requests for No. 1 Data storage action from Input means 1 (S51). The processing means 4 receiving this request generates a new window object different from the browser window object operated by application 13 and describes application data in corresponding window object. Here, executing window.open method generates a new window object. The application data, furthermore, displayed in the display object of application 13 can be acquired from the innerHtml attribute of the object acquired by executing the object.getElementById method. In addition, executing the document.write method describes the data of corresponding new window object.

The user, next, stores the source (including the application data) described in the corresponding new window object in to the local file system as a substance file of the application data (S53). More concretely, for instance, using the Internet Explorer 6.0 (registered trademark) of the Windows (registered trademark) which is a standard HTTP client, the user selects the [Source] from the [Display] of the menu in the newly opened window and stores the source file being displayed in the desired folder of the user. In case of Mesilla Firefox 1.5 (trademark), the page is selected from [File]=> [Store page giving the name] from the menu in the newly opened window and stored by selecting the [File type]=> [Web page, complete] on the displayed dialog.

For instance, for all the steps until here, more concisely, user can be enabled to select a scope by putting a mark to specify the selection of the scope on web application and can be enabled the users to voluntarily store corresponding copy contents in to the optional text file who selected [copy] with right-click operation.

The user, next, notifies application 13 the "Destination for storing the data substance file" (file path identifier in the local) (S54). As a method for the same, Processing means 4 calls the file reference dialog on HTTP client 12, accepts selection of the file called by the user in this file reference dialog, and embeds file path identifier of the selected file in text box of the same dialog. Application 13 executes the object.getElementByld method and acquires the file path identifier displayed in the text box of this dialog or enable user to enter file identifier of data substance file in text box by operating the Input means 1 or he may also be enabled to acquire the relative path from an application or absolute path of the data substance file based on the file identifier acquired by the application 13 which was entered in the corresponding text box.

The user, next, requests for an action to create a hyperlink for bookmark (S55). Application 13, which receives this request, creates and displays the hyperlink, which includes file path identifier of the data substance file, acquired in prior process, in to the position information (S56). The method of creating this hyperlink, for instance, same as step S18 of the No. 1 Embodiment, which rewrites the href property of the hyperlink, object.

The user, next, will be able to store the file path identifier of the data substance file stored in a corresponding hyperlink in local by storing the said hyperlink in to the bookmark file. This operation is same as steps S19 and S20 of the No. 1 Embodiment.

[No. 6 Embodiment]

Figure 8:
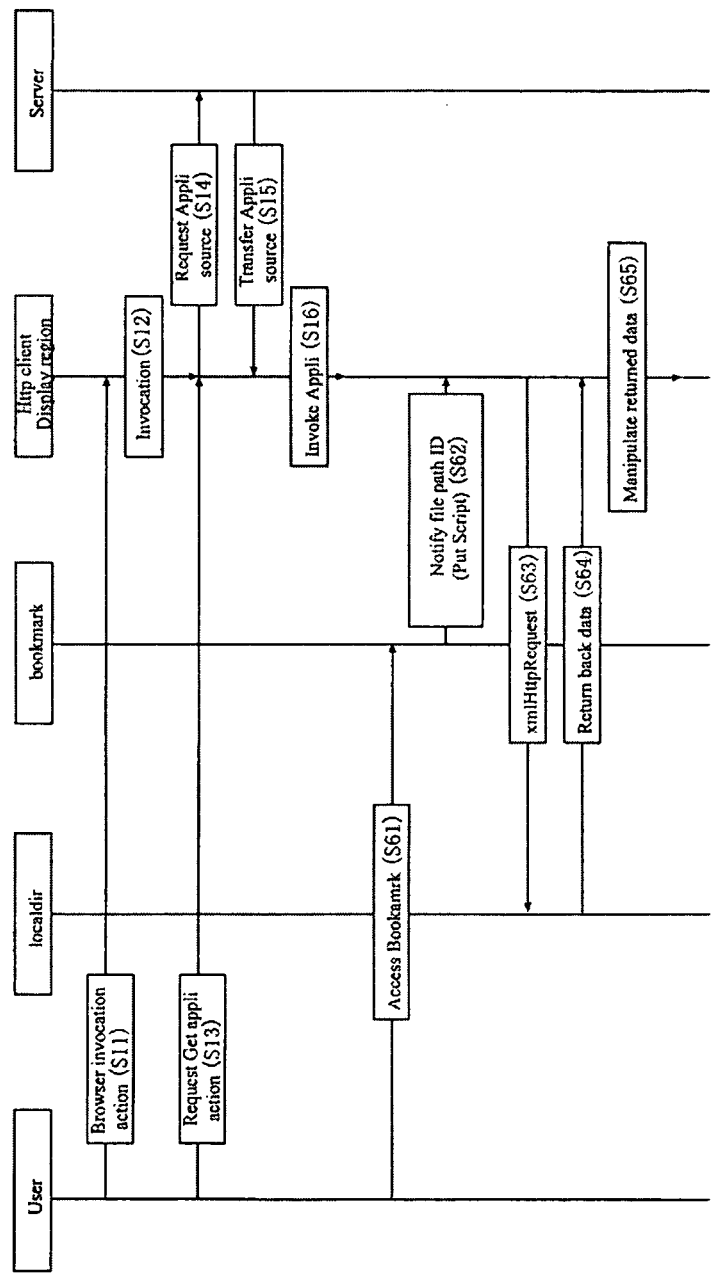
FIG. 8 is an operation explanation diagram of the No. 6 Embodiment.

Next, the process of reading out again the application data stored in local in No. 5 Embodiment and operating it on application is explained. FIG. 8 describes the details.

FIG. 8 includes steps S11~S16 that starts browser 12 and starts application 13 on it. The repeat explanation is omitted because it is same as No. 1 Embodiment.

User, after starting the application, accesses the bookmark file stored in No. 5 Embodiment (S61). The method for accessing bookmark file is similar to S21 explained in the No. 2 Embodiment.

Here, the bookmarklet introduced in No. 2 Embodiment or bookmarklet like javascript:void (fload (file path identifier)) is stored in "address information storage region" of the bookmark file.

When script, described like mentioned above, is stored in the area of the "address information storage region" of the bookmark file, the processing means 4 reads out the said script from the "address information storage region" of the corresponding bookmark file and executes on HTTP client 12. If HTTP client 12 executes corresponding script, the said bookmarklet is executed and the script is executed for application 13 operating on HTTP client 12 (S62). Application 13, as a result, calls and executes the fload( ) function described in the script and then acquires the file path identifier of the data substance file same as No. 2 Embodiment.

Application 13, that acquired file path identifier, issues a XMLHttpRequest to the location of local directory indicated by corresponding file path identifier (S63). As a result, application 13 is enabled to acquire the value of the application data described in the corresponding file from the data substance file present at location indexed by the corresponding file path identifier (S64).

Application 13 reads the value of application data acquired from the data substance file and make it executable for user.

[No. 7 Embodiment]

By the way, the acquisition of the application data explained in the No. 6 Embodiment can be done also by removing access to bookmark file. Following is the detailed description about the said method based on FIG. 9.

Figure 9:
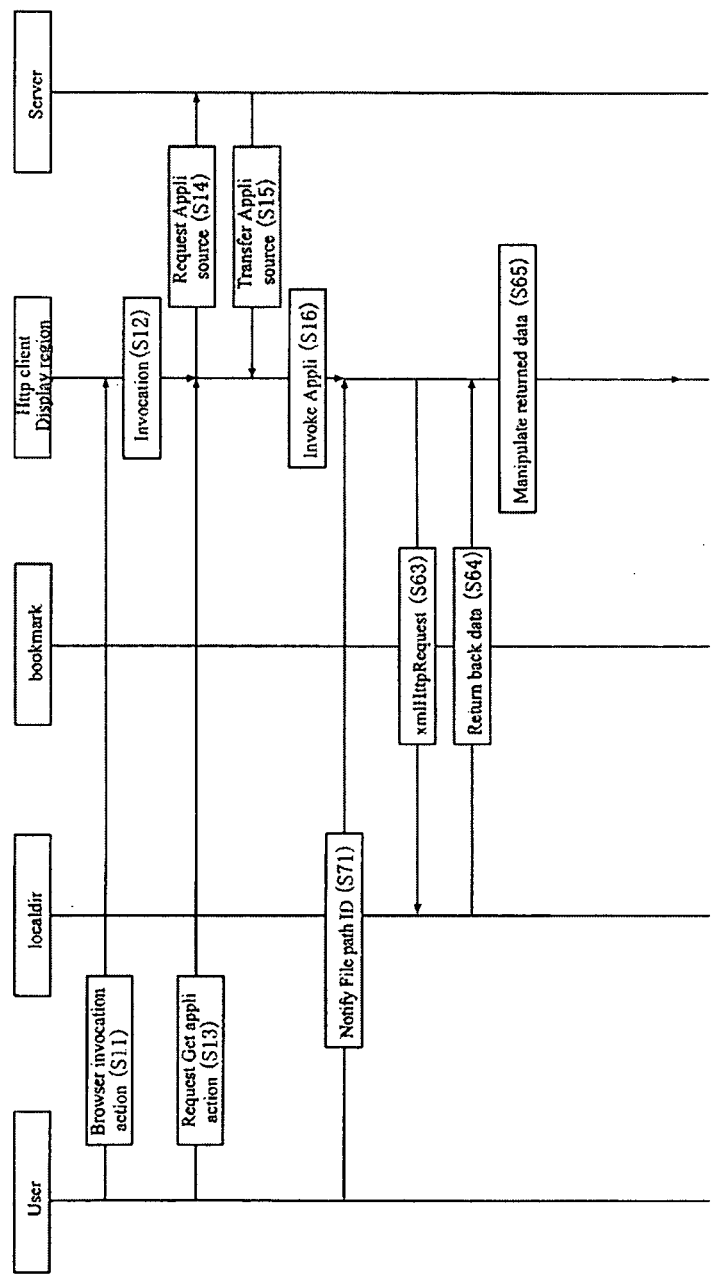
FIG. 9 is an operation explanation diagram of the No. 7 Embodiment.

FIG. 9 includes operation of S11~S16 that starts browser 12 and starts application 13 on that browser. The repeat explanation is omitted since this operation is same as No. 1 Embodiment.

In No. 6 Embodiment, after starting the application, the file path identifier of data substance file is acquired accessing the bookmark file. However, if user knows "data substance file path", notifying application 13 the file path identifier known by the user serves the purpose. In such case, the user notifies application 13 the file path identifier of the data substance file (S71). This operation can be achieved same as step S54 of the No. 5 Embodiment.

After the file path identifier is acquired, same as the step S63-65 of No. 6 Embodiment, the XMLHttpRequest is issued and the application data value being acquired with the said method is made available to user in executable state.

[No. 8 Embodiment]

The embodiment explained below is an example of transforming the said No. 5 Embodiment. Again, an explanation is given referring to FIG. 7. The contents of the link created in S56 of this embodiment are different from the No. 5 Embodiment. Other operations are same as the said No. 5 Embodiment.

This embodiment assumes that the hyperlink created with S56 is a hyperlink, which indicates the application acquisition source and stores a file path identifier of the data substance file in its argument part. This argument need not necessarily be a content, which can be interpreted by the logic already provided on the server side.

Here, it is assumed that the position information of the application acquisition source is an http://www.myappli.com/index.html, and assumed that the file path identifier of the application data stored in the hyperlink is a C_appli_data_data1_txt.

Processing means 4 creates the hyperlink for the bookmark in step S56. The method of creating the hyperlink, for instance, is same as step S18 of the No. 1 Embodiment, which rewrites the href property of the hyperlink object. At this time, as position information of the hyperlink, it creates information with an application data added in the position information of application acquisition source. It is created, for instance, as an http://www.myappli.com/index.html?data=C_appli_data_data1_txt.

As a result, in step S20, a bookmark file, that holds http://www.myappli.com/index.html?data=C_appli_data_data1_txt in the "address information storage region", is stored in local. That is, along with the application acquiring address, the file path identifier of the application data is stored in the local.

Here, though data was stored as an argument of the application acquiring address, the address specified for an application acquiring address may be not corresponding to the application which creates the hyperlink.

[No. 9 Embodiment]

Next, a description is given of an operation with which the file path identifier of the application data is acquired from the bookmark file stored in the local in No. 8 Embodiment, furthermore, a description is given of an operation with which an application data from a data substance file indexed by the corresponding file path identifier is acquired and deployed on application. A description is given referring to again a FIG. 6, since this operation resemble with the said No. 4 Embodiment.

Figure 6:
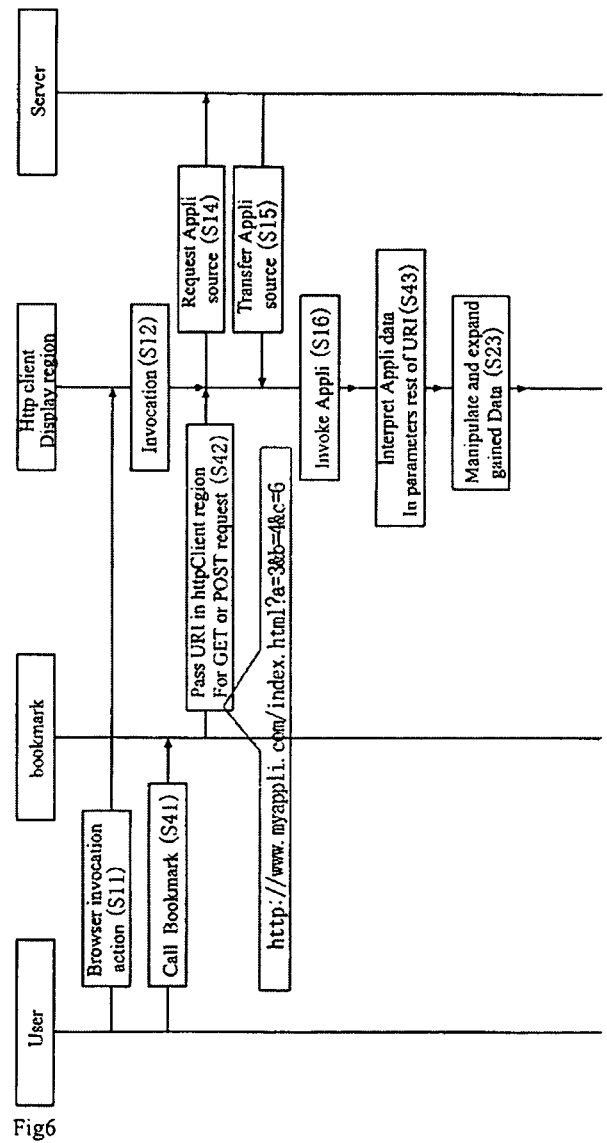
FIG. 6 is an operation explanation diagram of the No. 4 Embodiment.

The only the difference between this embodiment and the said No. 4 Embodiment is operation of S43. Other operations are same as the No. 4 Embodiment. However, the URI(http://www.myappli.com/index.html?a=3&b=4&c=6) described in FIG. 6 is read in a different way like http://www.myappli.com/index.html?data=C_appli_data_data1_txt, since it is corresponding with the No. 8 Embodiment which was explained earlier.

Well, the operation of S43 in this embodiment is as follows. Application 13, which started according to the steps of S41, S42, and S14~S16, acquires the file path identifier of the application data from the parameter after the "?" of URT, that performs URT request.

The acquisition is done, for instance, as follows. The parameter (character string), which is present after the "?" of URI, for instance, can be acquired from the location object using the method as explained in S43 of No. 4 Embodiment. The value of file path identifier (C_appli_data_data1_txt), further, can be taken out of the character string by applying the split method which specifies delimiter "=" on the acquired parameter character string.

Application 13 specifying the file path identifier, distinguishes the local directory that has to issue the XMLHttpRequest using the script which identifies the local directory from the file path identifier defined beforehand and issues XMLHttpRequest for corresponding directory. Application 13, as a result, can acquire the value of the application data described in the corresponding file from the data substance file present at place indexed by corresponding file path identifier.

According to each embodiment explained above, the data of the application 13 of the WEB application operating on HTTP client 12 or the mechanism storing the data in the local file system can be achieved comparatively easily by applying an existing bookmark function.

[No. 10 Embodiment]

The next explained embodiment includes an example that web application divides the data handled by the corresponding web application that decentralizes and stores the corresponding divided plurality of data in plurality of bookmark file. Moreover, it is an example where the web application reads out each decentralized data being stored in the plurality of bookmark file and integrates each of corresponding data being read.

As per this embodiment, the meaning of decentralizing and storing the data in plurality of the bookmark file, is given below. There is a limitation on the length of the data for storing it into a bookmark file. Therefore, a data crossing the limitation of the length cannot be stored in one bookmark file. Then, the long data is divided into the data fragments, and each data fragment is optimized so that it can be stored in one bookmark file. The long data can be stored in bookmark file by decentralizing and storing the data fragment being divided in the plurality of the bookmark file. Hence, when the data, which is divided and stored with the said process, needs to be read-out again, it becomes necessary to integrate and generate the data fragments being read-out.

Figure 2:
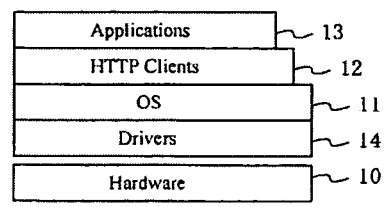
FIG. 2 is a structural diagram of a software necessary to execute this invention.

The hardware configuration and the software configuration used to execute this embodiment are the same as the configuration shown in already explained FIG. 1 and FIG. 2. Therefore, the repetition explanation that relates to the corresponding hardware configuration and the software configuration is omitted.

Moreover, in this embodiment, an operation with which the corresponding data of the web application 13 handled by it is stored in bookmark file, basically, is same as the operation of the No. 1 Embodiment shown in FIG. 3. Therefore, given below is an explanation of the part of operation of this embodiment, mainly, which is different from the No. 1 Embodiment.

In FIG. 3, operation up to step S11-S17 from this embodiment is the same as the No. 1 Embodiment. Therefore, the repeat explanation is omitted.

In this embodiment, when creating a link for the bookmark in step S18, the data is divided in data fragments and divided data fragments are decentralized in plurality of the link objects and then embedded.

Processing means 4 reads out the data from the memory region, which should be stored in the bookmark, divides the corresponding data being read-out in to plurality of data fragments and stores each of the corresponding data fragments being divided in to the memory region.

Moreover, processing means 4 links common parent identifiers to each of the data fragment to show that the each data fragment being divided was generated from common source data. The corresponding parent identifier is generated such that the different parent identifiers can be associated with the data fragments having different source data. For instance, the time when the source data is divided can be assumed to be a parent identifier.

Moreover, Processing means 4 links an individual data fragment identifier to each of the data fragment to identify mutually each of the data fragments being divided from the source data. For instance, a continuous number such as 0, 1, 2, . . . can be assumed to be a data fragment identifier.

Processing means 4, further, generates the plurality of the hypertext link element (Hereafter, it is called as link element) which stores each data fragment.

Processing means 4 embeds all of the data fragment being divided such as the data fragments, the parent identifier associated with the corresponding data fragment, the data fragment identifier associated with the corresponding data fragment to href property (position information region) of each of the link element. These parameters can be embedded in the form of the bookmarklet in href property.

Processing means 4 displays each of the link element, where every different data fragment is embedded, in the display area of the HTTP client.

Source program given below, developed in JavaScript (registered trademark), is an example of executing the program to achieve the operation of the S18 step explained until now. The said program is described in the form of the function "doonclick ( )". This program divides the data (character string) which consists of optional number of characters into the data fragment of six characters, and embed it in plurality of the link elements. For example, when the data is of 30 characters, the 5 data fragments consisting 6 characters each are divided and the embedded. (However, in this execution example, one data fragment is separated in 2 parts consisting 3 characters each in one link element.)

[Count 1]

```
function doonclick ( ){
    var tgtvalue = document.getElementByld(tgt).innerText;
    var dvlink = document.getElementByld('link')
    dvlink.innerHTML = " ";
    var len = Math.ceil(tgtvalue.length/6)
    Var c = 0:
    Var Dt = new Date( )
    Var id = 'id_' + Dt.getTime( )
    while(tgtvalue.length>c*6){
        var linkobj = document.createElement('a');
        linkobj.id = 'bm' + id + c;
        linkobj.innerText = 'bm_'+id+'_'+c;
        var st1= tgtvalue.substr(c*6.3)
        var st2 = tgtvalua.substr(c*6+3.3):
        linkobj.href 'javascript:void(fload("'id+'"'+len+','+c+,
        "'+st1+'","'+st2+'"))';
        dvlink.appendChild(linkobj)
        var br document.createElement('br');
        dvlink.appendChild (br);
        c++;
    }
    var dv = document.createElement('dv');
    dv.innerText = 'Above link Save all '+c+' items.';
    dvlink.appendChild(dv):
}
```

The variable and element used by function doonclick ( ) are as follows.

tgt: Area with data created in application 13
tgtvalue : Value of data acquired from tgt (character string)
link: Area where link element is described
dvlink: Value of area where link element is described
len: Number of link elements generated according to data length
c: Value of data fragment identifier
Dt: Value of date
id: Value of parent identifier
linkobj: link element
st1:Value of data fragment (Upper 3 characters from 6 characters)
st2:Value of data fragment (Lower 3 characters from 6 characters)
fload( ):Function, which integrates data fragments (described later)
dv: Area to display comment As mentioned above, this embodiment includes the step S18 step shown in FIG. 3 that divides and embeds the data fragment in plurality of link elements and creates plurality of link elements for the bookmark. In continuation to steps S19 and S20, the user executes the data storage action on every corresponding plurality of the link elements and stores plurality of the bookmark files.

The flow of this processing is basically similar to the flow of FIG. 4 explained in the N. 1 Embodiment. Therefore, an explanation is given referring to FIG. 4. In this FIG. 4, operation of step S11-S16 is same as the No. 1 Embodiment, which has already been explained. Therefore, the repeat explanation of same part is omitted.

In step S21, the user opens corresponding plurality of bookmark files created using the said data storage action. Processing means 4 includes processes that detects whether corresponding bookmark file is opened, reads out the data fragment stored in corresponding bookmark file, the parent identifier associated to corresponding data fragment, the data fragment identifier associated to corresponding data fragment, all of the data fragments being divided (S22).

Processing means 4, further, compares total count of data fragment associated to the corresponding data fragment with the count of data fragment having linked to the parent identifier, which is associated to the data fragment being read from all of the acquired data fragments and determines whether all of the data fragments having same parent identifier are read.

Processing means 4, further, when all of the data fragments having same parent identifier are read, integrates corresponding data fragments being read according to the prescribed rule and reconfigures the data handled by application 13 (S23).

Here, the rule for integrating the data fragments is optional and it is not mandatory that the source data before dividing in to data fragments be necessarily reproduced. Moreover, it is not mandatory that the application used for dividing the data and the application used for integrating the data be necessarily same. Only the rule for integrating the data fragments shall be compatible to the form of data required by the application, which performs corresponding integration.

Source program given below, developed in JavaScript (registered trademark), is an example of executing the program to achieve the operation of the steps S22, S23 explained until now. The said program is described in the form of the function "fload ( )". This program is compatible with the bookmarklet stored using the said doonclick ( ) function. Script calling the function fload ( ) is stored in the bookmarklet stored by function doonclick ( ). Therefore, when user opens this bookmarklet, the value is passed to function fload ( ) and then executed. In this execution example, when function fload ( ) is executed, the upper value St1 and lower value st2 are separated from each of the data fragment stored by the function doonclick ( ). Here, a data in which only the upper value st1 of each data fragment and other data in which lower value st2 of each data fragment are integrated, are reconfigured.

[Count 2]

```
function fload (id,total,cnt,st1,st2){
    if (!ary[id]) {
        ary[id] = new Array( );
    }
    If (ary[id][cnt]) {
        return;
    }
    ary[id][cnt] = new Object( );
    ary[id][cnt].st1=st1;
    ary[id][cnt].st2=st2:
    if (total= = ary[id].length){
        for (var i □0; I < ary[id].length; i++){
            if(ary[id][i] = = undefined || ary[id][i] = = null){
                alert (I + ' ' + ary[id][i]);
                return;
            }
        }
        var stFin1= ' ';
        var stFin2= ' ';
        for (var i = 0; i<total; i++){
            stFin1 += ary[id][i].st1;
            stFin2 += ary[id][i].st2;
        }
        document.getElementById('get1').innerText = stFin1;
        document.getElementById('get2').innerText = stFin2;
    }
}
```

The relation between the variable of above-mentioned function fload ( ) and the variable in above-mentioned function doonclick ( ) is shown as follows.

id: compatible to id
    total: compatible to len
    cnt: compatible to c st1: compatible to st1
    st2: compatible to st2

Moreover, other elements that function fload ( ) uses are as follows. Ary [ ] [ ]:Array variable, which stores each data fragment read from the plurality of the bookmark files.

stFin1, stFin2: Variable storing the data, which integrates data, fragments get1, get2: Object in display area displaying the data, which consist integrated data fragments.

The following shown part from the source program of the said function fload( ) checks whether the entire data fragment necessary for the data reconfiguration is read. When all of the data fragments essential for data reconfiguration are not read, the function processing ends after displaying an alert.

[Count 3]

```
if (ary[id][i]== undefined || ary[id][i] == null){
    alert(I + ' ' + ary[id][i]);
    return;
}
```

According to this embodiment explained above, it is possible to store the data by decentralizing it in plurality of the bookmark files. As a result, long data can be stored in a bookmark file exceeding the limitation of the data length, which can be stored in one bookmark file.

In FIG. 10 and FIG. 11, an example of HTML file of web application, in which this embodiment is used, is explained. The program continues from FIG. 10 to FIG. 11. The program shown in this FIG. 10 and FIG. 11 contains the above-mentioned doonclick( ) function and the fload( ) function.

This invention is not limited only to the above-mentioned embodiment. For instance, information other than the "web application acquisition source" and the user data may be additionally stored in the bookmark file and the data file. The web application may be started from the application stored in the local folder and need not to be started from web server. The storage destination location for data which was stored once in one web application need not necessarily be present only in one book mark, but the plurality of hyperlinks can be created in continuation and data can be divided and stored in plurality of the bookmarks. However, in such case, for the bookmarks to be read-out in continuation, an identifier of the successor bookmark to be read-out can be embedded in the preceding bookmark being read-out. In that case, when reading the bookmarks, you may provide the user the method of identifying all the relating bookmarks. Moreover, while reading a bookmark or when reading is finished, you may urge user sending the notification to read the successor bookmark. You may make user to divide the application data in plurality of the files when the user is made to store the application data in places other than the bookmark. In that case, when reading, you may offer the user the method of identifying all the divided data files. Moreover, while reading a file or when reading is finished, you may urge user to read the successor file. Moreover, for instance, you may use this invention as a method of using data mutually between pluralities of the web applications, like method of handing over data to another application.

The invention claimed is:

1. A method for storing character string application data, the method comprising:
   (a) identifying the character string application data which is within a property of an application and processed by the application, the application operating on an HTTP client;
   (b) storing the character string application data into a memory region by dividing the character string application data into a plurality of character string data fragments;
   (c) decentralizing and embedding the plurality of the character string data fragments into a plurality of position information regions of a hyperlink character string; and
   (d) storing the plurality of position information regions of the hyperlink character string into the local file system.

2. The method of claim 1, which includes:
   (a) storing the character string application data in the local file system as a file; and
   (b) acquiring an identifier of the file.

3. The method of claim 1, which includes:
   (a) embedding position information of the application into an address information storage region in a bookmark file;
   (b) embedding the character string application data in the address information storage region; and
   (c) storing the bookmark file in the local file system.

4. The method of claim 1, which includes:
   (a) storing the character string application data in the local file system;
   (b) acquiring an identifier of the stored character string application data;
   (c) embedding position information of the application in an address information storage region in a bookmark file;
   (d) embedding the acquired data identifier in the address information storage region; and
   (e) storing the bookmark file in the local file system.

5. The method of claim 1, which includes:
   (a) accepting a first storage action;
   (b) receiving the first storage action;
   (c) generating a second window object that is different than a first window object of the HTTP client;
   (d) operating the application;
   (e) describing the character string application data processed by the application in a source of each window object;
   (f) accepting a second storage action; and
   (g) storing the source, including the character string application data, described in each window object into the local file system as a data substance file.

6. A method for reading character string application data, the method comprising:
   (a) identifying the character string application data in a hyperlink character string, the character string application data divided into a plurality of character string data fragments that are decentralized and embedded into a plurality of position information regions of the hyperlink character string, which is stored in a local file system;
   (b) reading the character string application data from a position information region of the hyperlink character string;
   (c) displaying the character string application data which is within a property of the application and processed by the application, the application operating on an HTTP client;
   (d) reading the plurality of character string data fragments from the plurality of position information regions of the hyperlink character string stored in the local file system; and
   (e) reconfiguring the character string application data handled by the application by integrating the plurality of decentralized character string data fragments that are embedded into the plurality of position information regions of the hyperlink character string.

7. The method of claim 6, which includes:
   (a) reading an identifier of the character string application data handled by the application from the position information region of the hyperlink character string; and
   (b) accessing the character string application data associated with the identifier.

8. The method of claim 6, which includes:
   (a) accepting a file path identifier of a data substance file that includes the character string application data;
   (b) transmitting the file path identifier to the application;
   (c) issuing a XMLHttpRequest to a local directory location indicated by the file path identifier for the application which acquired the corresponding file path identifier; and
   (d) after issuing the XMLHttpRequest, acquiring a value of the character string application data described in the data substance file and acquiring the data substance file present at a location indexed by the file path identifier for the application.

* * * * *